United States Patent [19]

Hirata et al.

[11] Patent Number: 5,229,997
[45] Date of Patent: Jul. 20, 1993

[54] CARRIER RECOVERY CONTROL WITH SEQUENTIAL FEC SYNC DETECTION AND FRAME SYNC DETECTION

[75] Inventors: Yozo Hirata; Hizuru Nawata, both of Tokyo, Japan

[73] Assignee: NEC Corporation, Japan

[21] Appl. No.: 854,244

[22] Filed: Mar. 20, 1992

[30] Foreign Application Priority Data

Mar. 20, 1991 [JP] Japan .................................. 3-81591

[51] Int. Cl.$^5$ ............................................... H04J 3/06
[52] U.S. Cl. ................................ 370/104.1; 370/105.4
[58] Field of Search ............... 370/100.1, 104.1, 105.1, 370/105.4, 19, 20; 375/114

[56] References Cited

U.S. PATENT DOCUMENTS

5,161,194  11/1992  Ujiie .................................. 370/94.1

FOREIGN PATENT DOCUMENTS

0369406  5/1990  European Pat. Off. .

Primary Examiner—Douglas W. Olms
Assistant Examiner—Melvin Marcelo
Attorney, Agent, or Firm—Ostrolenk, Faber, Gerb & Soffen

[57] ABSTRACT

At the transmit end of a communications system, a convolutional code of a multiplex of an information-bearing signal and a unique word is modulated upon a transmitted carrier. At the receive end, the transmitted carrier is demodulated with a local carrier to detect the convolutional code. The error rate of a decoded version of the convolutional code is determined, and an out-of-FEC-sync signal is produced when the error rate is higher than a threshold value. Unique words are detected from the decoded signal and counted during a prescribed time interval to produce an out-of-frame-sync signal when the count falls below a threshold. The frequency of the local carrier is swept in the presence of the out-of-FEC-sync signal. When the signal ceases to exist, a timeout period is set, and the local carrier frequency is swept again when the timeout period expires during the presence of the out-of-frame-sync signal.

4 Claims, 2 Drawing Sheets

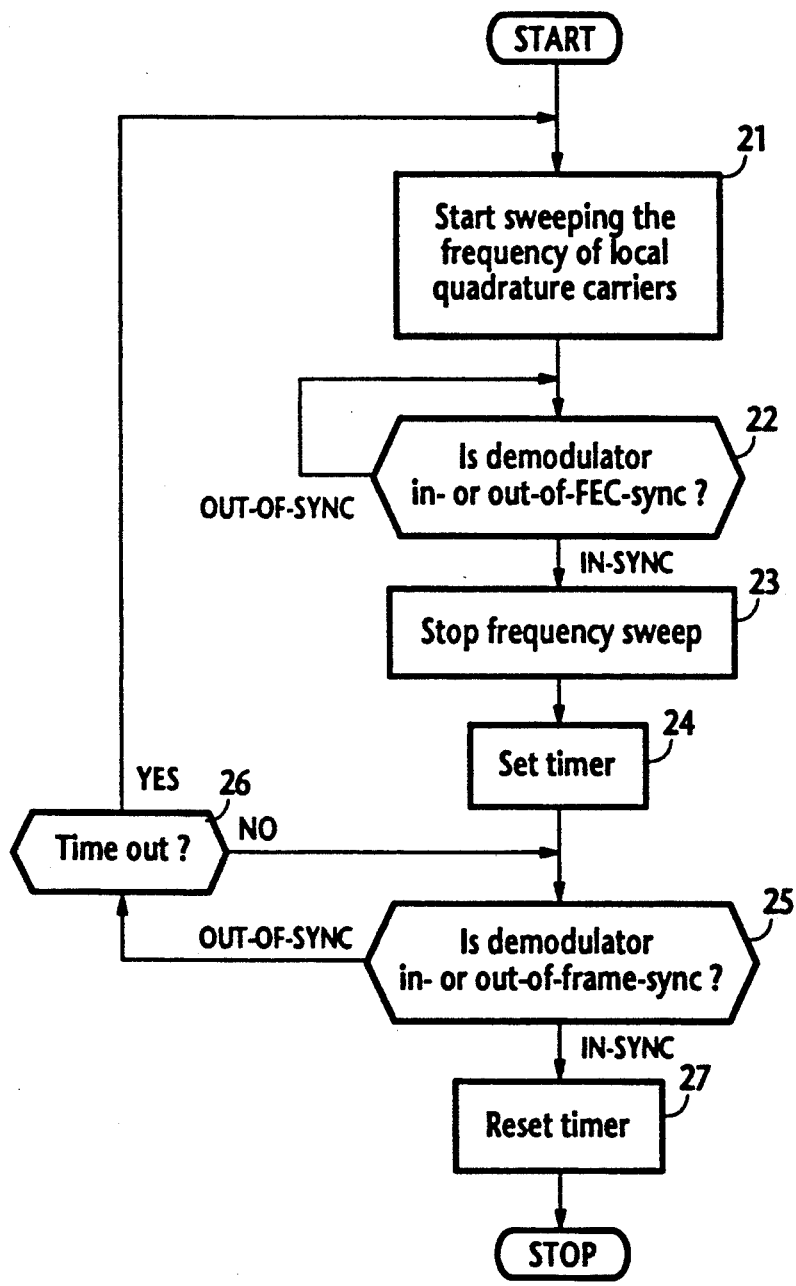

CARRIER RECOVERY CONTROL WITH SEQUENTIAL FEC SYNC DETECTION AND FRAME SYNC DETECTION

BACKGROUND OF THE INVENTION

The present invention relates generally to a communications systems, and more specifically to a local carrier frequency control technique to establish synchronization with a transmitted carrier.

Satellite communications between very small aperture terminals operate on the convolutional coding scheme to take advantage of its low-cost but powerful forward error correcting capability, instead of the expensive pilot signaling scheme, due to the demanding cost effectiveness. This results in a VSAT design that incorporates automatic frequency tracking ability in order to operate with a satellite whose transmit frequency is subject to change under hostile environment.

Conventional VSAT's employ coherent detection for demodulating a received M-ary PSK (phase-shift keyed) convolutional codes. The received PSK signal is mixed with local carriers to produce I- and Q-channel signals, which are coupled to a convolutional decoder. Phase difference between the demodulated signals and the local carriers is detected and is used to control the carriers' phase to establish carrier synchronization. Synchronization is also established between the frequency of the local carriers and the symbol rate of the convolutional codes by detecting the error rate of the I- and Q-channel signals and controlling the carrier frequency so that the error rate is reduced below a specified value. A replica of the transmitter's convolutional encoder is coupled to the convolutional decoder and a correlator is provided for determining the correlation between the output of the convolutional encoder and one input of the convolutional decoder. Since the output of the convolutional encoder is a replica of the original codeword, the correlator produces a signal which increases in amplitude with the error rate of the signal at the input of the convolutional decoder. A maximum detector is connected to the correlator to control the phase of the input to the convolutional decoder when the error rate exceeds a specified value.

A coherent M-ary PSK detector is described in European patent application no. 0 369 406 as a solution to this problem. According to this prior art, a convolutional decoder corrects errors contained in demodulated I- and Q-channel baseband signals during its decoding process. The error rate of the output of the convolutional decoder is monitored and an in-sync detect signal is generated when the error rate is smaller than a specified threshold as an indication that the convolutional decoder is synchronized with the I- and Q-channel signals. A series of different VCO control voltages are generated as corresponding to frequency candidates in response to the in-sync detect signal to permit the PSK detector to synchronize successively with the baseband signals at the candidate frequencies. The power levels of the information and noise components of the baseband signals are further detected and signal-to-noise ratios are successively derived from the detected power levels. A maximum value of the signal-to-noise ratios is then detected and one of the candidate VCO control voltages that corresponds to it is adopted and maintained as a valid VCO control voltage.

However, one shortcoming of this prior art is that, since signal-to-noise ratios are measured at all points below the decision threshold of the error rate determination, it takes long to establish synchronism. Another disadvantage is that, since the signal-to-noise decreases with the ratio of energy-per-bit to noise density ($E_b/N_o$), difficulty arises in determining whether the PSK detector is properly synchronized during low $E_b/N_o$ ratios.

SUMMARY OF THE INVENTION

It is therefore an object of the present invention to provide an improved synchronization technique which allows quick determination of proper synchronization even when $E_b/N_o$ ratio is low.

Another object of the present invention is to provide a synchronizer which is simple to implement in comparison with the prior art synchronizer.

According to the present invention, there is provided a receiver for receiving a convolutional code of a multiplex of an information-bearing signal and a unique word which is generated at frame intervals, the convolutional code being modulated upon a carrier for transmission. The receiver includes a demodulator for demodulating the transmitted carrier with a local carrier and detecting the convolutional codes and a convolutional decoder for decoding the convolutional codes detected by the demodulator to produce a decoded signal. A forward error correction (FEC) sync detector is provided to determine the error rate of the decoded signal and generate an out-of-FEC-sync signal when the error rate is higher than a threshold value. Unique words are detected from the signal decoded by the convolutional decoder and counted during a prescribed time interval to produce an out-of-frame-sync signal when the count falls below a threshold value. The frequency of the local carrier is swept in the presence of the out-of-FEC-sync signal to allow the local carrier to synchronize with the transmitted carrier. A timeout period is then set if the out-of-FEC-sync signal ceases to exist. The local carrier frequency is swept again when the timeout period expires during the presence of the out-of-frame-sync signal, allowing the local carrier to resynchronize with the transmitted carrier.

BRIEF DESCRIPTION OF THE DRAWINGS

The present invention will be described in further detail with reference to the accompanying drawings, in which:

FIG. 2 is a flowchart describing a programmed sequence of steps performed by the frequency sweep controller of FIG. 2.

DETAILED DESCRIPTION

Figure 1:
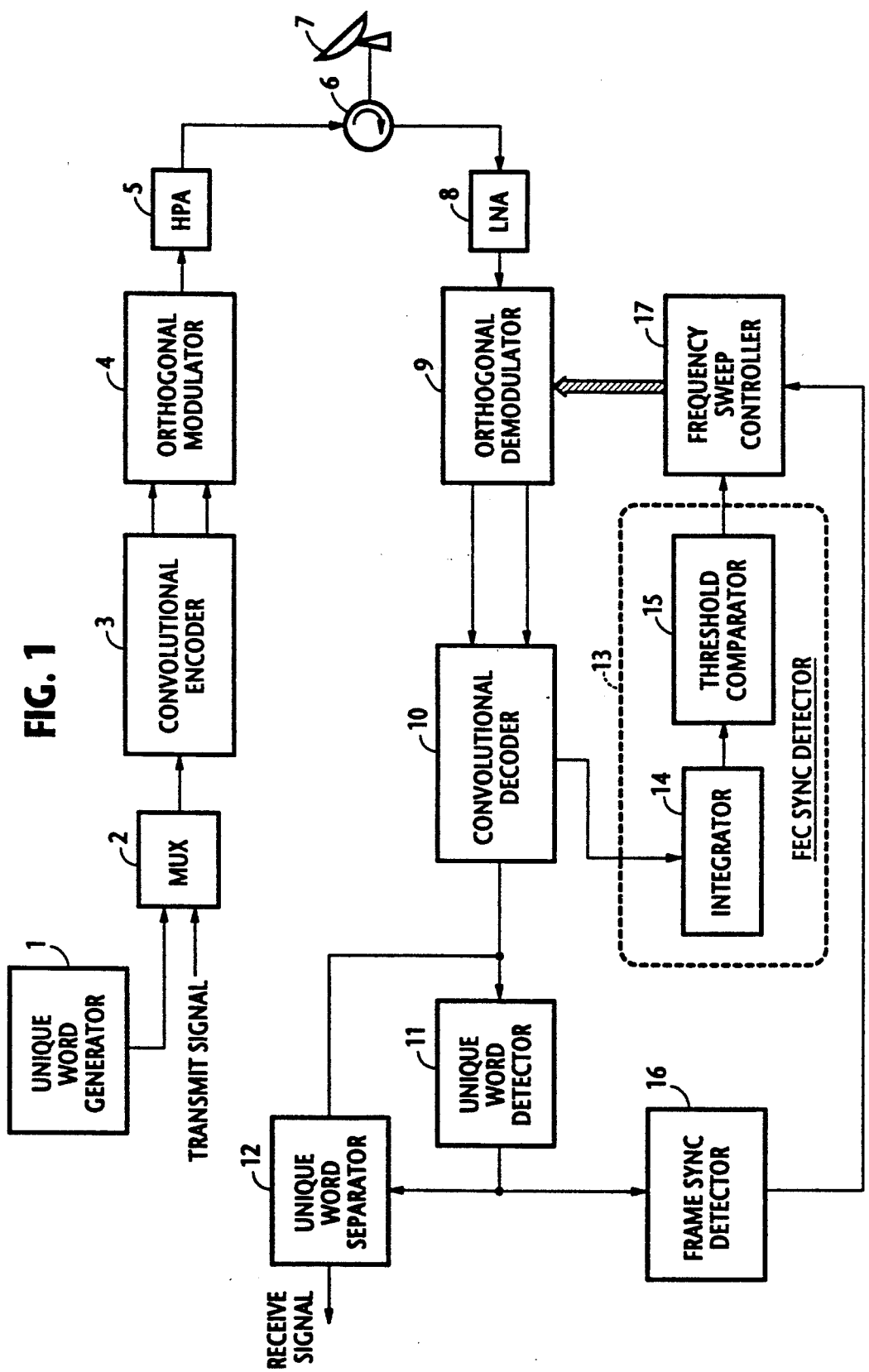
FIG. 1 is a block diagram of a very small aperture terminal of the present invention.

Referring to FIG. 1, a VSAT of this invention comprises a transmit section and a receive section. The transmit section of the VSAT comprises a unique word generator 1 for generating a unique word to define the start timing of a frame, the unique word being multiplexed with a transmit signal by a multiplexer 2 and fed into a convolutional encoder, or forward error correction (FEC) encoder 3. Convolutional encoder 3 produces I- and Q-channel signals as parallel bit streams, which are supplied to an orthogonal modulator 4 where they are respectively used to modulate quadrature carriers to produce a PSK signal. The PSK signal is amplified by a high power amplifier 5 and applied through the transmit port of a duplexer 6 to a small aperture antenna 7 for transmission to the satellite.

The receive section of the VSAT comprises a low noise amplifier 8 coupled to the receive port of duplexer 6, and an orthogonal demodulator 9 coupled to the output of amplifier 8 for modulating a received PSK signal from the satellite. Demodulator 9 includes a carrier recovery circuit, not shown, to recover the transmitted carrier using a coherent detection technique for generating local carriers of quadrature phase relationship for demodulating the PSK signal to produce replicas of the original I- and Q-channel baseband signals. The outputs of demodulator 9 are applied to a convolutional decoder, or forward error correction (FEC) decoder 10 such as Viterbi decoder for decoding the I- and Q-channel signals to produce an error corrected bit sequence and an error correction signal which is produced during the decoding process. As is well known, the Viterbi detector is capable of automatically correcting bit errors in the transmitted signal while performing its decoding process. The error-corrected bit sequence is supplied to a unique word detector 11 in which it is checked against a stored unique bit sequence to detect the transmitted unique word. A unique word separator 12 is provided for receiving the error-corrected bit sequence from convolutional decoder 10 to remove the unique words in response to the output of unique word detector 11. The output of unique word separator 12 is the receive signal for application to utilization circuitry, not shown.

According to the present invention, an FEC sync detector 13 is provided for receiving the error correction signal from convolutional decoder 10 to determine whether the convolutional decoding process is performed at proper timing. Specifically, FEC sync detector 13 includes an integrator 14 to which the error correction signal is applied, and a threshold comparator 15 coupled to the output of the integrator. Integrator 14 produces an output which increases with the error rate of the demodulated signal, and hence with the frequency deviation of the local carriers from the symbol rate of the transmitted signal. Threshold comparator 15 compares the output of integrator 14 with a predetermined threshold and produces a logical-1 output when it exceeds the threshold, indicating that a substantial amount of bit errors exists in the demodulated signals. Under such conditions, the local carriers are not synchronized with the symbol rate of the received PSK signal, and the logical-1 output is applied as an out-of-FEC-sync signal. When the error rate is below the threshold value, FEC sync detector 13 produces a logical-0 output which is applied as an FEC in-sync signal.

A frame sync detector 16 is connected to the output of unique word detector 11. This frame sync detector constantly monitors those of the detected unique words which are generated during a prescribed time interval and determines whether the local carriers are in- or out-of-sync with the frame timing of the transmitted carrier and produces a frame in-sync signal when the count of detected unique words exceeds a threshold value or an out-of-frame-sync signal when the count reduces below it.

A frequency sweep controller 17 is responsive to the outputs of both sync detectors 13 and 16 to control the frequency of the local carriers of the demodulator 9.

Specifically, frequency sweep controller 17 is programmed to perform steps as shown in FIG. 2. The program execution begins with step 21 to start sweeping the frequency of the local carriers of demodulator 9. Control exits to step 22 to check the output of FEC sync detector 13 for an out-of-FEC-sync condition. As long as the answer is affirmative, the output of FEC sync detector 13 is checked. When the decode timing of the convolutional decoder 10 is determined by FEC sync detector 13 as being synchronized with the incoming signal, the decision at step 22 is negative, and control branches to step 23 to stop the frequency sweep. Exit then is to step 24 to set a timer to start a timeout period, and then proceeds to step 25 to check the output of frame sync detector 16 for an out-of-frame-sync condition. If the answer is affirmative at step 25, control branches to step 26 to check for the elapse of the timeout period. If so, control returns to the starting point of the program, otherwise it repeats the execution of step 25. Therefore, the output of frame sync detector 16 is repeatedly checked during the timeout period after FEC synchronism has been established. In this way, frame sync detector 16 is allowed to determine within the timeout period whether the demodulator is in frame sync with the incoming signal. If demodulator 9 fails to establish frame synchronization within the timeout period, the program is repeated from the starting point. Otherwise, control branches to step 27 to reset the timer, and terminates the program.

It is known that if the frequency difference between the local carriers and the transmitted carrier is an integral submultiple of the symbol rate of the transmitted signal, the carrier recovery circuit of the demodulator is likely to be in a state in which false synchronization is said to occur with the transmitted carrier frequency. If signals are transmitted in a QPSK (quadriphase shift keyed) format, such false carrier synchronization (i.e., pseudo-in-sync condition) occurs when the frequency of the local carriers deviates by an amount equal to one-half of the symbol rate. Under such indeterminate conditions, $\pi$-phase shifts occur at alternate symbols and the signal recovered by convolutional decoder 10 is different from the transmitted signal.

As a result, frequency sweep controller 17 is able to quickly exit out of the loop of frame sync search at the expiry of the timeout period and restarts frequency sweep for valid carrier synchronization.

In addition, since the synchronization technique of the present invention is not dependent on the signal-to-noise ratio of a received signal, the prior art difficulty associated with the determination of proper synchronization during low $E_b/N_o$ ratios is avoided.

What is claimed is:

1. A receiver for receiving a convolutional code of a multiplex of an information-bearing signal and a unique word which is generated at frame intervals, said convolutional code being modulated upon a transmitted carrier, comprising:

a demodulator for demodulating the transmitted carrier with a local carrier and detecting the convolutional codes;

a convolutional decoder for decoding the convolutional codes detected by the demodulator to produce a decoded signal;

a forward error correction (FEC) sync detector coupled to said convolutional decoder for determining an error rate to the decoded signal and generating an out-of-FEC-sync signal when said error rate is higher than a threshold value;

a unique word detector for detecting said unique word from the signal decoded by said convolutional decoder to produce an output signal;

a frame sync detector for counting the output signal of said unique word detector generated during a prescribed time interval and producing an out-of-frame-sync signal when the count of said output signal falls below a threshold value; and a frequency controller for sweeping the frequency of said local carrier in the presence of said out-of-FEC-sync signal to allow said local carrier to synchronize with said transmitted carrier, setting a timeout period in response to the absence of said out-of-FEC-sync signal, and sweeping the frequency of said local carrier again when the timeout period expires during the presence of said out-of-frame-sync signal to allow said local carrier to resynchronize with said transmitted carrier.

2. A satellite communications system comprising:

a transmitter comprising:

means for generating a unique word at frame intervals and multiplexing the unique word with an information-bearing signal to produce a multiplex signal;

a convolutional encoder for converting the multiplex signal into a convolutional code; and an orthogonal modulator for modulating said convolutional code upon a carrier and transmitting the carrier to a satellite, and a receiver comprising:

a demodulator for receiving the transmitted carrier from said satellite and demodulating the received carrier with a local carrier and detecting the convolutional codes;

a convolutional decoder for decoding the convolutional codes detected by the demodulator to produce a decoded signal;

a forward error correction (FEC) sync detector coupled to said convolutional decoder for determining an error rate of the decoded signal and generating an out-of-FEC-sync signal when said error rate is higher than a threshold value;

a unique word detector for detecting said unique word from the signal decoded by said convolutional decoder to produce an output signal;

a frame sync detector for counting the output signal of said unique word detector generated during a prescribed time interval and producing an out-of-frame-sync signal when the count of said output signal falls below a threshold value; and a frequency controller for sweeping the frequency of said local carrier in the presence of said out-of-FEC-sync signal to allow said local carrier to synchronize with said received carrier, setting a timeout period in response to the absence of said out-of-FEC-sync signal, and sweeping the frequency of said local carrier again when the timeout period expires during the presence of said out-of-frame-sync signal to allow said local carrier to resynchronize with said received carrier.

3. A very small aperture terminal comprising:

means for generating a unique word at frame intervals and multiplexing the unique word with an information-bearing signal to produce a multiplex signal;

a convolutional encoder for converting the multiplex signal into a convolutional code;

an orthogonal modulator for modulating said convolutional code upon a carrier;

a high power amplifier for amplifying the modulated carrier;

an antenna system coupled to the output of said high power amplifier;

a low noise amplifier coupled to said antenna system for amplifying a transmitted carrier received by said antenna;

a demodulator for demodulating the received carrier with a local carrier and detecting the convolutional codes;

a convolutional decoder for decoding the convolutional codes detected by the demodulator to produce a decoded signal;

a forward error correction (FEC) sync detector coupled to said convolutional decoder for determining an error rate of the decoded signal and generating an out-of-FEC-sync signal when said error rate is higher than a threshold value;

a unique word detector or detecting said unique word from the signal decoded by said convolutional decoder to produce an output signal;

a frame sync detector for counting the output signal of said unique word detector generated during a prescribed time interval and producing an out-of-frame-sync signal when the count of said output signal falls below a threshold value; and a frequency controller for sweeping the frequency of said local carrier in the presence of said out-of-FEC-sync signal to allow said local carrier to synchronize with said received carrier, setting a timeout period in response to the absence of said out-of-FEC-sync signal, and sweeping the frequency of said local carrier again when the timeout period expires during the presence of said out-of-frame-sync signal to allow said local carrier to resynchronize with said received carrier.

4. In a receiver for receiving a convolutional code of a multiplex of an information-bearing signal and a unique word which is generated at frame intervals, said convolutional code being modulated upon a transmitted carrier, said receiver comprising a demodulator for demodulating the transmitted carrier with a local carrier and detecting the convolutional codes and a convolutional decoder for decoding the convolutional codes detected by the demodulator to produce a decoded signal, a method for controlling the frequency of said local carrier, the method comprising the steps of:

a) determining an error rate of the decoded signal and determining that said local carrier is out of timing with the transmitted convolutional code when said error rate is higher than a threshold value;

b) detecting said unique word from the signal decoded by said convolutional decoder, counting the detected unique words during a predetermined time interval, and determining that said local carrier is out of timing with the frame intervals of the transmitted carrier;

c) sweeping the frequency of said local carrier in the presence of the determination of the step (a) to allow said local carrier to synchronize with said transmitted carrier;

d) setting a timeout period if the determination of the step (a) ceases to exist; and e) sweeping the frequency of said local carrier when the timeout period expires during the presence of the determination of the step (b) to allow said local carrier to resynchronize with said transmitted carrier.

* * * * *